United States Patent [19]
Roberts

[11] 3,758,986
[45] Sept. 18, 1973

[54] PLANTER POT SPRINKLER UNIT

[76] Inventor: James C. Roberts, 1860 Jeffrey, Escondido, Calif.

[22] Filed: Mar. 10, 1971

[21] Appl. No.: 122,671

[52] U.S. Cl. .......................... 47/38, 47/39, 239/523
[51] Int. Cl. ............................................. A01g 27/00
[58] Field of Search ............... 47/1.2, 27, 34–34.13, 47/38–39; 239/521, 524

[56] References Cited
UNITED STATES PATENTS

| | | | |
|---|---|---|---|
| 3,505,760 | 4/1970 | Ambrose | 47/38 |
| 1,453,401 | 5/1923 | Mattson | 47/38.1 X |
| 3,482,785 | 12/1969 | Chapin et al. | 47/38 X |
| 3,028,705 | 4/1962 | Howard | 47/34.13 |
| 2,084,005 | 6/1937 | Richards | 47/1.2 |
| 2,714,531 | 8/1955 | Kromer | 239/521 |
| 1,880,364 | 10/1932 | Sestito | 47/34.12 |
| 1,863,914 | 6/1932 | Tyler | 239/524 |
| 2,289,889 | 7/1942 | Stick | 235/524 |
| 3,108,400 | 10/1963 | Wolfe | 47/38 |
| 2,909,328 | 10/1959 | Babyak | 47/48.5 |

FOREIGN PATENTS OR APPLICATIONS

| | | | |
|---|---|---|---|
| 86,096 | 10/1965 | France | 47/38 |
| 958,150 | 5/1964 | Great Britain | 47/38 |

Primary Examiner—Robert E. Pulfrey
Assistant Examiner—Eugene H. Eickholt
Attorney—Carl R. Brown and Neil F. Martin

[57] ABSTRACT

A sprinkler unit that is made integral with the side of a planter pot. The sprinkler unit has a plug that fits into a water supply hose and the plug has a restricted channel that directs the stream of water against a platform that is open on one side and has angled walls to direct the spray over the area of the pot.

9 Claims, 4 Drawing Figures

PATENTED SEP 18 1973 3,758,986

INVENTOR.
JAMES C. ROBERTS
BY Brown & Martin
ATTORNEYS

PLANTER POT SPRINKLER UNIT

BACKGROUND OF THE INVENTION

It is often the practice to raise plants in small planter pots and then to sell the plants in the planter pots. Thus the planter pots have to be relativey inexpensive and hold only one or a group of plants. In raising the plants in the planter pots, it is necessary to water the plants in the planter pots. This requires the watering of many groups of planter pots. The plants and planter pots may be watered individually or, as is the usual method, by spraying water over a group of planter pots. The latter method directs water to areas between the planter pots causing water to flow on the ground around the pots, resulting in loss of water, drainage problems, and bad environmental conditions. Further the spraying of water over a large area does not cover the area evenly. Also it is often necessary to water plants in the planter pots at different time intervals and this is not possible with overall sprinkler systems. Thus it is advantageous to have a water sprinkling system that is capable of watering individual plants in individual planter pots without watering large surrounding areas and to provide individual watering to each planter pot to generally restrict the watering to the particular area of each planter pot, and yet not require a complicated sprinkling system but a sprinkling system that is a part of the structure of the planter pot.

SUMMARY OF THE INVENTION

In a preferred embodiment of this invention, the sprinkler unit is made integral with the side of a planter pot. The planter pot is usually made of plastic or other suitable type materials that may be formed or or molded to provide the sprinkler unit of this invention as an integral part of the planter pot, while maintaining a relatively inexpensive and simple construction. The sprinkler unit is positioned in a slot in the side of the planter pot that may be at the intersection of two intersecting sides of the planter pot, or at any location on a circular planter pot. A platform at the bottom of the slot has an upwardly, axially projecting plug. The plug has a longitudinal water conducting groove over which a water supply hose tightly fits. The water is directed through the groove to the platform, which platform has angled side walls that direct the water over the platform into the restricted area of the pot. The platform being at the bottom of the slot, is positioned at a level below the upper edges of the side or sides of the pot. Thus the water spray is substantially restricted to the area of the pot. The sides of the slot substantially abut the water supply hose, further restricting the passage of water through the slot to the environment outside the planter pot.

This unique structural part of the planter pot provides a simple and inexpensive means for watering the planter pot, which structure passes with the planter pot to the customer buying the plant. The small flexible hose may be connected to a supply manifold for a number of sprinkler units, wherein any known programming means may be used to water all of a given number of plants in a restricted manner or on a selective basis. When the plants have grown sufficiently to be moved from the system, then another planter pot may be immediately moved into the same position without requiring movement of the water supply hose or the manifold. Thus an inexpensive, simplified, easy to use, sprinkler system is provided for watering planter pots.

It is therefore an object of this invention to provide a new and improved planter pot sprinkler unit.

It is another object of this invention to provide a new and improved planter pot sprinkler unit that is integral with the side or sides of a planter pot and that does not require any separate structure other than a water supply hose, to provide controlled spray distribution of water to the restricted area of the planter pot.

It is another object of this invention to provide a new and improved planter pot sprinkler unit wherein the sprinkler unit is an integral part of the planter pot and yet does not distract from the overall appearance of the planter pot.

Other objects and many advantages of this invention will become more apparent upon a reading of the following detailed description and an examination of the drawing, wherein like reference numerals designate like parts throughout and in which.

Figure 1:
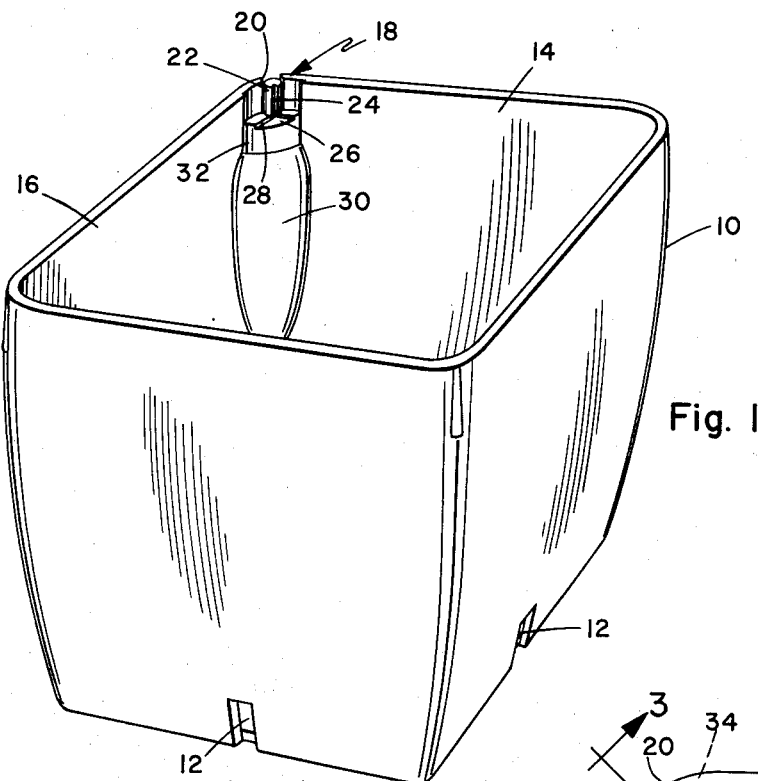
FIG. 1 is a perspective view of a planter pot incorporating the integral sprinkler unit.
Figure 2:
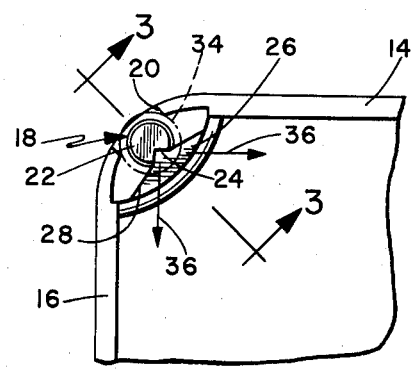
FIG. 2 is an enlarged top plan view of the sprinkler device.

Referring now to FIG. 1, a planter pot 10 has sides 14 and 16 with a sprinkler unit 18 at the intersection thereof. The sprinkler unit 18 is positioned in slot 20 that terminates in a platform 26. Projecting axially from the platform 26 is a plug member 22 having a longitudinal groove 24 that extends from the upper end of the plug 22 to the platform 26. Platform 26 has side walls 28 that frame the platform to the volume of the planter pot 10. The sprinkler unit 18 is supported on a base 32 that is recessed at 30 to allow the planter pots 10 and 12 to be stacked.

Figure 3:
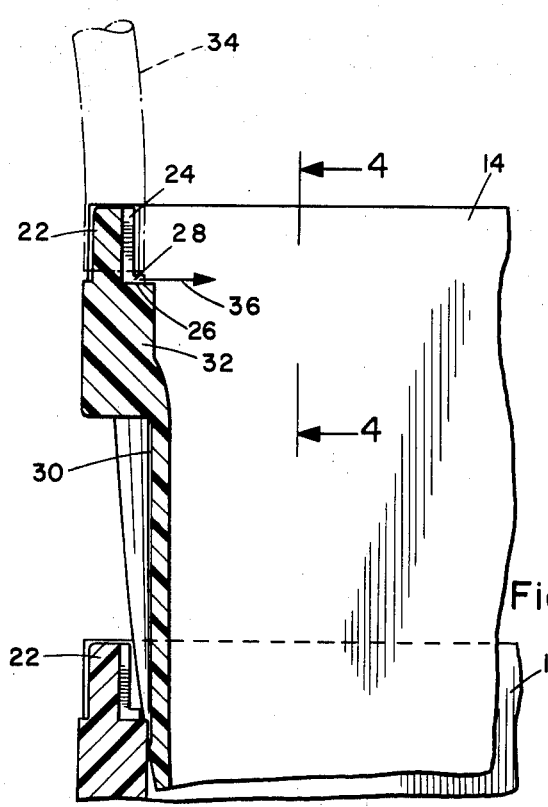
FIG. 3 is a sectional view taken on line 3—3 of FIG. 2, and showing a portion of a second planter pot sprinkler unit in nested position.
Figure 4:
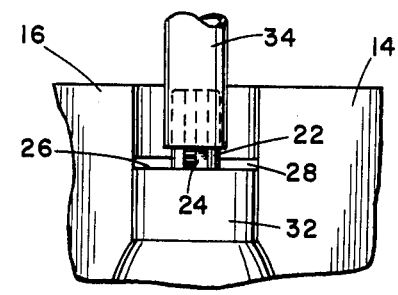
FIG. 4 is a view taken in the direction of arrows 4—4.

In operation, a water supply hose 34 is fitted over the end of the plug 22 in the manner illustrated in FIGS. 3 and 4. Water flows through the hose 34 and through groove 24 where it contacts platform 26 and is projected outwardly in the form of a spray. The direction of the spray is controlled both by the groove 24 as well as side walls 28. Thus the water passes through the hose 34 and is directed in the direction of arrows 36 to provide a fine spray over the area of the planter pot 10.

It is to be noted that the upper edges of the sides 14 and 16 as well as the other sides of the planter pot 10 are higher than the platform 26. Thus the water in the spray is generally contained within the area of the planter pot itself. The sides of the slot 20 closely abut the tube 34, restricting the spray of water outside of the planter pot in the reverse direction.

The planter pot 10 may be made of any suitable material but is preferably made of plastic or similar type materials that are easily molded in an inexpensive molded pot construction. While the view in FIG. 1 enlarges the size of the sprinkler unit for description purposes, the sprinkler unit is normally a smaller portion of the pot structure. Openings 12 provide the normal drain holes for the potted plants. The hose 34 may be connected to any suitable manifold water source so that each of the potted plants can be individually watered. While a four sided planter pot is described in the embodiment, it should be understood that the invention can also be incorporated in round planter pots or in other planter pot shapes.

Having described my invention, I now claim:

1. A planter pot having an enclosing side wall with a bottom wall and an open top, sprinkler means integral with said side wall and adjacent said open top for receiving water from a water supply hose and sprinkling the volume of said planter pot within said enclosing side wall, said sprinkler means including a platform open to the side adjacent the internal volume of said side wall, a substantially cylindrical plug projecting longitudinally upward from said platform for insertion into the water supply hose, and said plug having a longitudinal water conducting groove aligned with said platform opening, which groove is terminated at said platform.

2. A planter pot sprinkler unit as claimed in claim 1 in which, said platform being spaced below the edge of the open end of said planter pot.

3. A planter pot sprinkler unit as claimed in claim 2 in which, said plug projecting in a direction substantially parallel to said side wall.

4. A planter pot sprinkler unit as claimed in claim 2 in which, said platform projecting radially inwardly from said side wall.

5. A planter pot sprinkler unit as claimed in claim 4 in which, said side wall of said planter pot having a slot projecting downwardly from the upper edge of said open top, and said slot being adjacent said plug with said plug being in line with said open slot.

6. A planter pot sprinkler unit as claimed in claim 5 in which, said plug being spaced from said slot a distance whereby upon the water supply hose being positioned on the plug, the outer surface of the hose fits in said open slot.

7. A planter pot sprinkling unit for receiving water from a water hose and sprinkling the water substantially solely within the volume of the planter pot comprising, a planter pot having an enclosing side wall with an open top, a sprinkler unit positioned in said side wall which sprinkler unit has a longitudinal plug member with a longitudinal channel for being inserted into the end of a water supply hose, a platform at one end of said cylindrical plug which platform has side walls mating with the longitudinal groove in said cylindrical plug for directing water passing through said groove outwardly from said side walls to spray over the volume of the planter pot, and said platform being positioned below the upper edge of the open top of said planter pot and being positioned in the internal volume of said planter pot.

8. A planter pot having a plurality of connected intersecting sidewalls, a bottom wall and an open top edge, sprinkler means for making a connection with a water supply hose and directing water in a spraying motion solely within the volume of said planter pot, said sprinkler means is positioned at the intersection of one of said sidewalls and is spaced below the open top edge, said sprinkler means is integral with said planter pot, said sprinkler means includes a platform with intersecting side walls, said platform is open to the side opposite said side walls, a substantially cylindrical plug projects longitudinally from said platform at the intersection of said side walls of said platform for insertion into a water supply hose, and said plug has a longitudinal water conducting groove terminating at said intersection of said side walls of said platform.

9. A planter pot sprinkler unit as claimed in claim 8 in which, said side walls of said platform diverge from said groove.

* * * * *